United States Patent

Stites

[15] 3,689,172
[45] Sept. 5, 1972

[54] PRECISION MACHINE TOOL STOP

[72] Inventor: William E. Stites, 4201 Fair Oaks, Menlo Park, Calif. 94025

[22] Filed: Nov. 25, 1970

[21] Appl. No.: 92,599

[52] U.S. Cl. .................................. 408/241, 33/165
[51] Int. Cl. .............................................. B23b 49/00
[58] Field of Search .......408/14, 10, 4, 241; 90/11 R; 33/181 R; 83/529

[56] References Cited

UNITED STATES PATENTS 3,037,405  6/1962  Steyskal ...................... 408/241
2,664,768  1/1954  Clyne ............................ 408/241

*Primary Examiner*—Gil Weidenfeld
*Attorney*—Jack M. Wiseman

[57] ABSTRACT

A precision machine tool stop mechanism to control the amount of movement of a machine tool. The mechanism comprises a main shaft member with individual engagement increments formed thereon at predetermined intervals, a detachable housing body movable longitudinally along the shaft, controllable pawl members within the housing adapted to engage and disengage the shaft member at select increments, a pawl actuating collar extending to the pawl members within the housing and adapted to control actuation of the pawl members in and out of engagement with the shaft member such that when in engagement the pawls and shaft member are locked to form a unitary structure and when out of engagement the housing is allowed to move freely along the main shaft to any select increment position. A fine adjustment sleeve may be carried by the housing and movable in fine increments in a direction parallel to the axis of the main shaft member.

12 Claims, 9 Drawing Figures

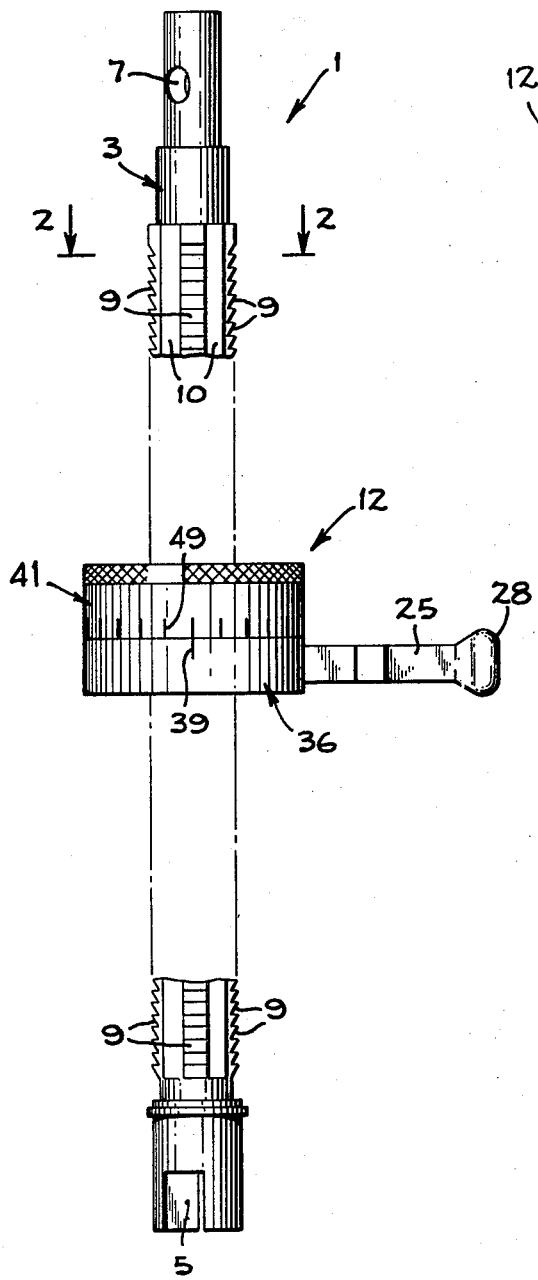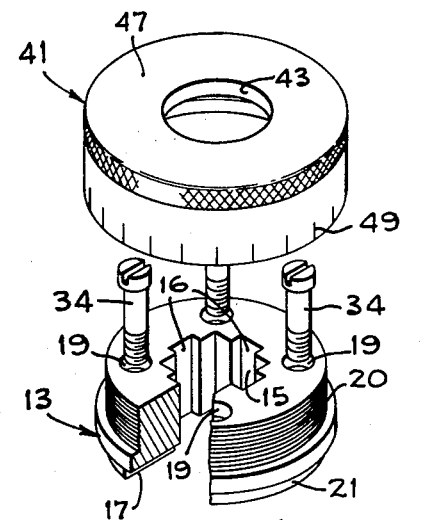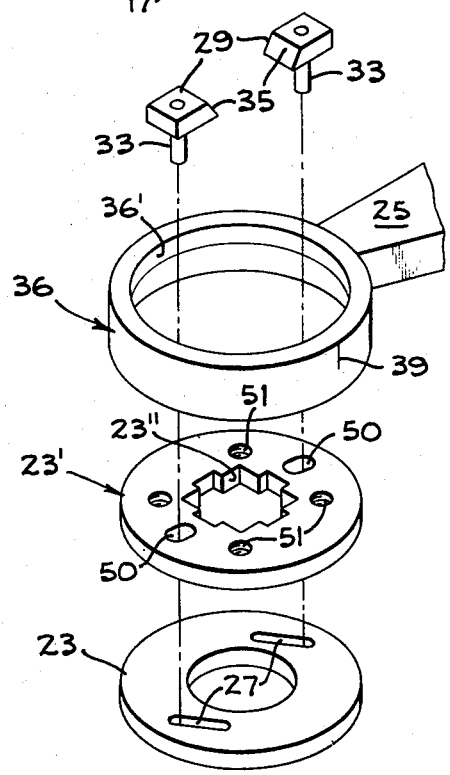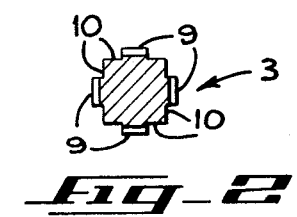

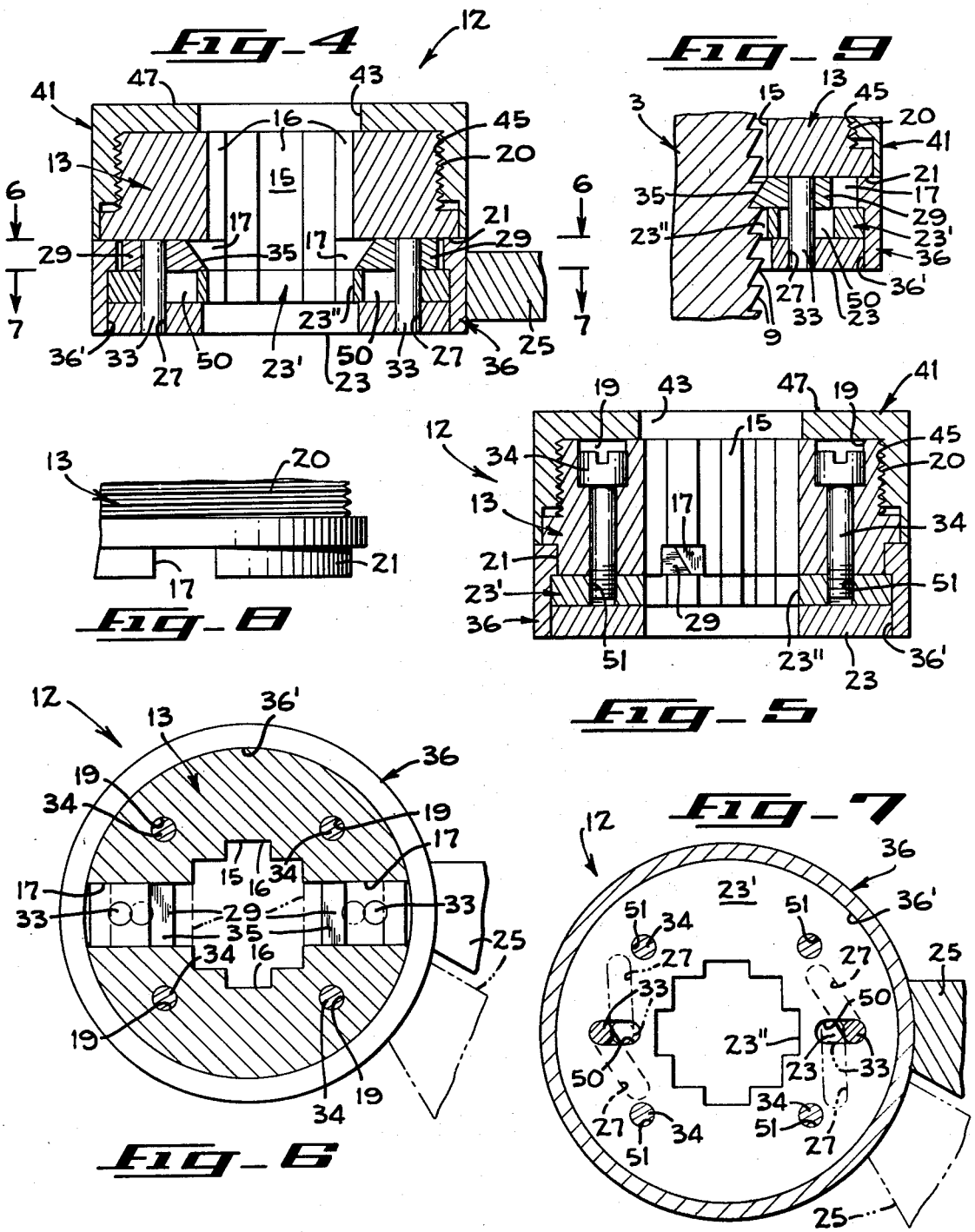

PRECISION MACHINE TOOL STOP

BACKGROUND OF THE INVENTION

The present invention relates to a precision machine tool stop mechanism. Applications for the mechanism include vertical milling machines, jig bores, lathes and other machine tools where it is desirable to control the movement and positioning of the working tool in relationship to a work piece.

There are presently available various stops for controlling the movement of machine tools as it operates on a work piece. For example, on a vertical milling machine it has been common to utilize a screw and nut combination to set the stops for controlling the vertical distance of travel of the spindle carrying the cutters. In setting up the machine, two threaded nuts, one being a lock nut, may be positioned along the screw for setting the extremity of movement. The nuts are screwed up and down the shaft to the desired stop position. This is time consuming and laborious.

SUMMARY OF THE INVENTION

The present invention teaches a precision machine tool stop which may be precisely set to any of various positions as desired. The stop may be set to the precise position very rapidly and with little physical effort.

An exemplary embodiment includes a main shaft member carrying individual projections along the longitudinal axis in the form of milled ratchet teeth. A housing assembly in the form of a slide block surrounds the shaft and houses precision pawl members adapted to engage the ratchet teeth of the shaft member. The pawl members are movable laterally towards and away from the shaft. The pawl members engagement and disengagement with the ratchet teeth are controlled by an actuating means including a quick release lever. The actuating means engages the pawl members to control movement of the pawl members towards and away from the shaft. When the pawls engage the shaft they are locked in place securing the housing body to the shaft. When the pawl members are away from the shaft, the housing body is disengaged from the shaft and free to move along the longitudinal axis of the shaft. A vernier sleeve is carried by the housing to be adjustable in a direction parallel to the axis of the shaft. Coarse adjustment of the stop position may be realized through select positional engagement of the shaft and pawl. Fine adjustment may then be set by the vernier sleeve.

BRIEF DESCRIPTION OF THE DRAWINGS

FIG. 1 is an elevational view of a precision machine tool stop according to the present invention;

FIG. 2 is a horizontal cross-sectional view of the main shaft of the tool stop taken along the line 2—2 of FIG. 1;

FIG. 3 is an exploded fragmentary perspective view of the stop of the tool stop shown in FIG. 1;

FIG. 4 is an axial sectional view of the stop shown in FIG. 3;

FIG. 5 is an axial view of the stop shown in FIGS. 3 and 4 displaced 90° from the sectional view shown in FIG. 4;

FIG. 6 is a horizontal sectional view of the stop taken along line 6—6 of FIG. 4;

FIG. 7 is a horizontal sectional view of the stop taken along line 7—7 of FIG. 4;

FIG. 8 is an enlarged fragmentary elevational view of the slide block of the stop shown in FIG. 3; and FIG. 9 is an enlarged fragmentary sectional view illustrating a pawl of the stop in engagement with the shaft of the tool stop.

DESCRIPTION OF THE PREFERRED EMBODIMENT

FIG. 1 illustrates in perspective a precision micrometer machine tool stop according to the teachings of the present invention and referred to by the general reference character 1. The tool stop 1 includes a main shaft 3 carrying at opposing ends means for securing with a machine tool to which the stop is to be utilized. For example, the depicted structure of FIG. 1 has been adopted to be incorporated on a vertical milling machine. At one end, the shaft 1 carries a rectangular type slot 5 which may engage a vice carried by the table of the machine tool and at the other end an aperture 7 to engage a fastener securing the shaft 3 to a support on the machine.

The shaft 3 is milled finite steps so as to form a plurality of evenly spaced projections in the form of ratchet stop teeth 9 along the longitudinal axis. The depicted shaft 3, as further illustrated by the cross-sectional view of FIG. 2, carries four sets of teeth 9 spaced 90° apart about its outer periphery. Obviously, the shape and number of sets of teeth 9 can vary. As shown, the teeth 9 are spaced apart along the longitudinal axis in equal increments, for example, 0.100 inches. Preferably, the shaft 3 is machined with precision to form the teeth 9 so as to allow precise settings. Intermediate adjacent sets of teeth is formed an L-shaped guide track 10 extending along the longitudinal axis. The tracks 10 may each carry a scale designating relative positions along the shaft.

Movable along the longitudinal axis of the shaft is a stop (FIG. 3) referred to by the general reference character 12. The stop 12 includes a spindle stop slide block 13 further depicted in detail in FIGS. 3, 4 and 8. The slide block 13 has an internal main aperture 15 of a configuration conforming with the external periphery of the shaft 3 about the teeth 9. For example, the aperture 15, when viewed in quadrants, includes four stairstep configurations joined together to coincide with the outer periphery configuration of the milled shaft 3 as shown in FIG. 2. Thus, the aperture forms a set of four L-shaped grooves 16 to accommodate the tracks 10 of the shaft 3. Hence, the block 13 has free axial movement relative to the shaft 3, but not free stop rotational movement relative to the shaft 3. Spaced 180° apart about the spindle block are two radially disposed rectangular type slots 17 opening to both the outer wall of the block 13 and the central aperture 15. Axially of the block and extending through it are apertures 19. It may also be noted that at its upper end, the block 13 carries a plurality of fine threads 20.

Intermediate the end surfaces of the block 13 is a circular guide groove 21 which extends about the entire circumference of the block. Received by the groove 21 is an actuating collar 36 further depicted in perspective in FIGS. 3–7. The actuating collar 36 is in the form of a cylindrical wall with an actuating arm 25 extending therefrom. To facilitate movement of the collar 36, a handle 28 adapted to be grasped by a finger or hand is connected to the actuating arm 25. The axial opening 36' of the collar 36 is sufficient to permit free movement thereof in the axial and rotatable direction relative to the shaft 3.

Within each slot 17 of a diametrically opposite pair of slots 17 is a substantially rectangular pawl 29 (See FIGS. 3, 4, 6 and 9) having near one end an aperture 31 for receiving a pin 33, which pin 33 extends downwardly therefrom. The pawls 29 are each free to slide within their associated slot 17. The direction of displacement is radial to the longitudinal axis of the shaft 3. The pawls 29 each carry a ratchet stop jaw 35 shaped and spaced apart to complement interlocking relationship with the ratchet stop teeth 9 on the shaft 3.

Disposed within the actuating collar 36 is a cam ring 23, which is pressed fitted within the actuating collar 36 for movement therewith. Formed in the cam ring 23 is a suitable axial opening to permit free movement thereof in the axial and rotatable directions relative to the shaft 3. Also formed in the cam ring 23 are a plurality of cam slots 27, which are diametrically opposite from one another and are eccentrically disposed relative to the axis of the shaft 3. Received respectively by the cam slots 27 are the pins 33 of the pawls 29.

Also disposed within the actuating collar 36 between the cam ring 23 and the block 13 is a retainer ring 23' (FIGS. 3–7). The retainer ring 23' is formed with a central opening 23" that is similar in configuration to the aperture 15 of the block 13. Thus, the retaining ring 23' has free axial movement relative to the shaft 13 but not free rotational movement relative to the shaft 3. The retaining ring 23' is slip fitted in the actuating collar 36 so as to support the same for rotation. Thus, the retaining ring 23' supports the actuating collar 36 while permitting the actuating collar to rotate relative thereto and also relative to the shaft 3. The retainer ring 23' moves in the axial direction with the actuating ring 36.

Formed in the retainer ring 23' are slots 50 which are sufficient in size to receive the pawl pins 33 without interfering with the movement thereof within the eccentric slots 27 of the cam ring 23. In addition thereto, formed in the retainer ring 23' are suitable openings 51, which are in register with the openings 19 of the block 13. Suitable screws 34 are received through aligned openings 19 and 51 to secure the retainer ring 23' to the block 13. Thus, the retainer ring 23' is supported by the block 13 through the screws 34. The block 13 can move in an axial direction but not in a rotatable direction. The actuating collar 36 is supported by the retainer ring 23. The actuating collar 36 is free to rotate about the shaft 3 relative to the retainer ring 23' and relative to the block 13. The actuating collar 36 moves in unison in the axial direction relative to the shaft 3 with the block 13 and the retainer ring 23'. The cam ring 23 moves in unison with the actuating collar 36 both in the rotational direction and in the axial direction as an integral part thereof. Therefore, rotation of the actuating collar 36 imparts rotation to the cam ring 23 relative to the block 13, relative to the retainer ring 23' and relative to the shaft 3.

Further viewing the cam ring 23 of FIG. 6, it will be noted that as a result of the angle of the eccentric cut slots 27 that the pin 33 within each of the slots 27 is displaced radially relative to the axis of the shaft 3 by the engaging wall surrounding the associated slot 27, in response to the rotation of the cam ring 23 about the axis of the shaft 3. As the cam ring 23 is rotated, the pins 33 are displaced within the slots to urge the associated pawls 29 into and out of engagement with the teeth 9 of the shaft 3. Thus, rotational movement of the cam ring 23 results in radial displacement of the pawls 29. Rotating the cam ring 23 in a clockwise direction as designated in FIG. 1 causes radially inward displacement of the pawls 29, i.e., the pawls 29 move toward the aperture 15 and the shaft 3, since the pins 33 are moving along the eccentric cut slots 27. Thus, the shaft 3 and the housing 12 are locked as a unitary structure. Rotation of the cam in a counterclockwise direction results in a retraction of the pawls and release of engagement of the stop 12 with the shaft 3. The cam ring 23 through the pins 33 urge the pawls 29 away from the center of the shaft. When the pawls 29 are out of engagement with the individual teeth 9 on the shaft 3, the stop 12 is free to slide along the shaft 3 in the longitudinal direction by relationship of the tracks 10 and grooves formed in the stop 12.

The top edge of the collar 36 engages a vernier adjustment thimble 41 having an aperture 43 through which the shaft 3 protrudes. Viewing FIGS. 4 and 5, the thimble carries internal threads 45 designed to be compatible with the threads 20 on the block 13. The thimble threads 45 engage the threads 20 such that the thimble 41 is movable up and down relative to the longitudinal axis of the shaft 3. The thimble 41 includes a flat top surface 47 along the upper edge of the side surface which serves as the stop surface for the mechanism 1. The thimble 41 is knurled along an external surface to provide a frictional engagement with the fingers of an operator for easier adjustment of the sleeve position. It may be noted that the threads 20 and 45 are finally graduated, e.g., in the order of 40 threads per inch. Thus, the position of the vernier thimble 41 may be changed minute amounts along and parallel with the axis of the shaft 3. The outer edge of the thimble sleeve 41 carries a scale 49 (FIG. 1) to allow for measured adjustments. The scale 49 may be marked off such that for each degree of rotation of the thimble in relationship to the marker 39 on the collar 36, the longitudinal displacement of the thimble 41 is indicated. For example, the indicator may be scaled to increments of longitudinal displacement of one-thousandths of an inch and even finer if desired. Accordingly, the selected stop teeth 9 may serve as a coarse positioning and the thimble 41 as the vernier adjustment. It will be noted that the coarse adjustment may be set rapidly by merely sliding the block 13 along the shaft and stopping at the position designated by a scale along the guide tracks 10.

I claim:

1. A machine tool stop comprising:
    a. a shaft; and
    b. stop means with a central opening for receiving said shaft and with a stop engaging surface, said stop means being movable axially along said shaft, said stop means comprising a locking member movable between positions of engagement and disengagement with said shaft, said stop means comprising rotatable actuating means rotatable about the axis of said shaft for moving said locking member between the positions of engagement and disengagement with said shaft.

2. A stop as claimed in claim 1 wherein said stop means includes a block with a central opening for receiving said shaft and with a radially disposed slot in which said locking member is disposed for radial movement relative to the axis of said shaft for movement between positions of engagement and disengagement with said shaft.

3. A stop as claimed in claim 2 wherein said stop means comprises an axially disposed pin disposed in engagement with said locking member for imparting movement thereto, said rotatable actuating means includes a central opening for receiving said shaft and is formed with a slot for receiving said pin, said slot of said rotatable actuating means being formed to impart radial displacement to said pin, whereby rotation of said rotatable actuating means about the axis of said shaft displaces said pin to impart movement to said locking member within the slot formed in said block for displacing said locking member radially relative to the axis of said shaft to move said locking member between the positions of engagement and disengagement with said shaft.

4. A stop as claimed in claim 3 wherein said shaft is formed with axially spaced projections therealong and wherein said locking member selectively engages one or more of said projections for locking said stop means to said shaft.

5. A stop as claimed in claim 4 wherein said shaft includes means for attachment to a machine tool.

6. A stop as claimed in claim 3 in which said shaft includes guide track means parallel to the axis of said shaft, and said stop means includes grooves for receiving in sliding guiding engagement said guide track means for sliding said stop means axially along said shaft.

7. A stop as claimed in claim 4 wherein said projections are in the form of a plurality of axially spaced apart ratchet teeth and the locking member is in the form of a pawl, the teeth and the pawl being shaped for complementary locking engagement.

8. A stop as claimed in claim 3 wherein said stop means includes a vernier adjustment for the fine adjustment of the position of the stop surface along said shaft.

9. A stop as claimed in claim 8 in which said vernier adjustment is in the form of a vernier thimble having a threaded inner surface.

10. A stop as claimed in claim 7 wherein said shaft is formed with a plurality of parallel sets of axially spaced ratchet teeth and said stop means includes a plurality of angularly spaced pawls, said pawls being arranged to engage said parallel sets of ratchet teeth respectively.

11. A stop as claimed in claim 10 in which said shaft includes an axially disposed guide track between successive parallel sets of teeth, and said stop means includes a groove between successive pawls, said grooves receive said tracks respectively in sliding guided engagement for sliding said stop means axially along said shaft.

12. A stop as claimed in claim 10 wherein said stop means includes a block with a centrally opening for receiving said shaft and with a plurality of radially disposed, angularly spaced slots, there being a pawl disposed in each of said slots in said block for radial movement relative to the axis of said shaft for movement between positions of engagement and disengagement with said shaft, said stop means comprises an axially disposed pin disposed in engagement with a pawl for imparting movement thereto, said stop means including a rotation actuating means with a central opening for receiving said shaft and with a plurality of slots for receiving said pins respectively, whereby rotation of said rotatable actuation member about the axis of said shaft displaces said pins to impart movement to said pawls within said slots of said block for displacing said pawls radially relative to the axis of said shaft to move said pawls between the positions of engagement and disengagement with said shaft.

* * * * *